March 7, 1950
E. V. BAILEY
2,499,449
SHANK COIL COVER
Filed Dec. 5, 1946
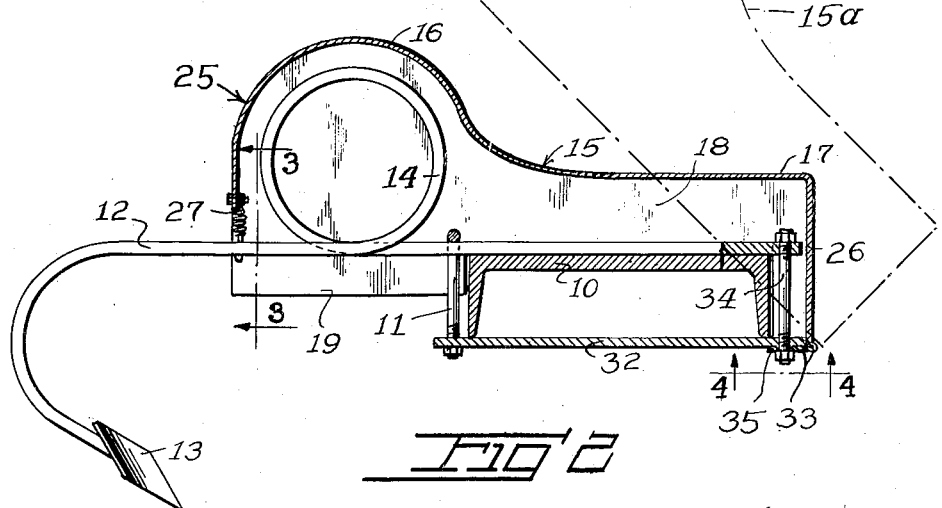
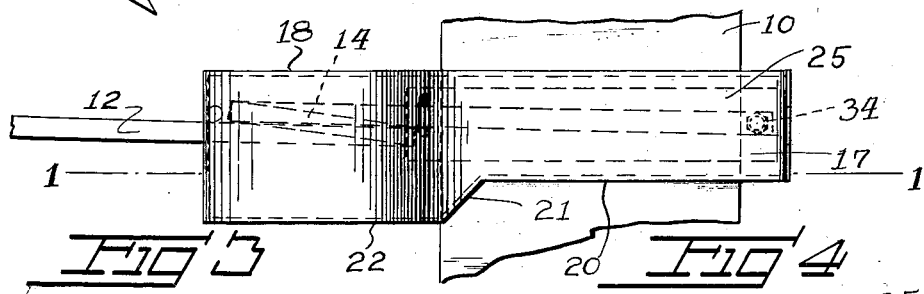
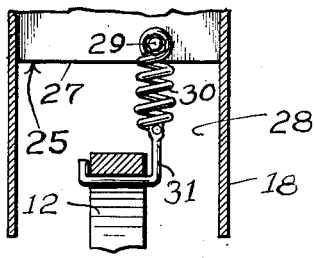 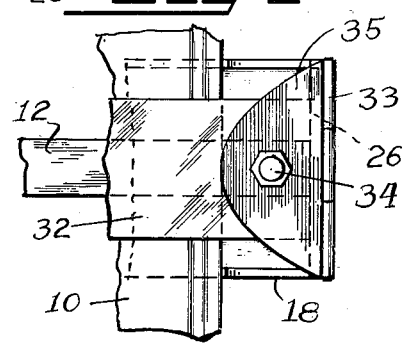
Inventor:
Edward V. Bailey
By Wilfred E. Lawson
Attorney:

Patented Mar. 7, 1950

2,499,449

UNITED STATES PATENT OFFICE 2,499,449

SHANK COIL COVER

Edward V. Bailey, Santa Paula, Calif.

Application December 5, 1946, Serial No. 714,157

3 Claims. (Cl. 97—179)

This invention relates to a protecting device for fruit trees, as applied over generally exposed spring coils, which are apt to injure the trees when the cultivator is operated in fruit orchards, particularly amongst lemon, orange or other citrus fruit trees.

The coil shanks on the cultivators when bare are very injurious to the trees as the limbs hang very low so that the fruit catches on the spring coils and shanks of the cultivator shovels and bills and is torn off.

The object of this invention is now to provide a cowl or cover over the spring coils, shanks and bolts, so that there are no parts to entangle with the fruit, which may now slide over the smooth cover surface without being injured or damaged in any manner. Further objects will be clear from the subjoined description with the aid of the attached drawing.

In the drawing one embodiment of the invention is illustrated.

Figure 1 is a longitudinal section of the device taken on a vertical plane along a line 1—1 of Figure 2;

Figure 2 is a top plan view of Figure 1;

Figure 3 is a fractional, sectional view taken along line 3—3 of Figure 1; and

Figure 4 is a fractional, bottom plan view as seen from line 4—4 of Figure 1.

Reference numeral 10 denotes a channel beam, on the cultivator on the top of which is secured by one or more U-bolts 11, the spring shank 12 terminating with a cultivator blade or bill 13, pointing downwardly and to the rear in the usual manner. Midway between the ends, the shank has one or more upturned coils 14, and it is mainly these coils that cause obstruction and are intended to be concealed and covered by the hood or cowl 15.

The same is preferably made of sheet metal about 1/16 inch thick; 4 inches wide in rear, 2 inches wide in front and 8 inches high over the coils at 16, where it is bent up to form an arch-like rear portion, gradually rising from the rectangular front portion at 17, which is about 2 inches high above the top face of the channel beam 10. The left wall 18 of the hood or cowl 15, is perfectly flat with its bottom edge at 19 dropped down below the top face of the channel beam 10, while the right wall has a straight front portion at 20 with an outward bend at 21, and a straight rear portion at 22, under the dome 16. This for the purpose to cover a spring shank with a great number of coils 14.

The roof or top 25 is curved upwardly to the profile of said plates and has a varying width corresponding to the space between them, that is 2 inches in front, where it is folded straight down, forming the front wall 26, and arched over the coils at 16, with a rise from the front wall, terminating at the rear with a straight edge 27 to provide a rear window opening 28 therebelow. Near this edge is provided a bolt 29 from which is suspended within the cowl, on a helical spring 30, a hook 31 intended to engage beneath the shank 12, which extends rearwardly thru the opening 28. Thus the rear end of the hood or cowl 15 is held down in position. The opening 28 is evidently needed to give access to the hook for applying it under the flat spring shank 12.

The bottom edge of the front wall 26 is provided with a holding down flap 35, hinged thereto as at 33. Beneath the channel beam 10 is carried a flat plate 32, thru which and also thru the front end of shank 12, runs a bolt 34 for securing the flap 35 together with the front wall 26 in position, see Figure 1. Similarly the U-belt 11 holds the shank 12 and plate 32 together on the channel beam 10.

It will now be evident that by covering over the obstructing coils and all bolts and projecting portions with the hood or cowl 15, no trees or their fruit in an orchard can be injured when the plowing or cultivating of the ground is performed with the cultivator. All corners or edges of the hood are therefore also well rounded.

Whenever the cultivator tool or spring-shank need attention or replacement, the hood may be raised into the dot and dash position at 15a, after disengaging the hook 31 from the shank 12.

During transportation of the cultivator from one orchard to another, the spring shank may be turned up or reversed by removing the nut on bolt 34 and loosening the U-bolt 11 and then disengaging the shank from 11 and slipping it out of the U-bolt. The shank 12 may then be inverted with the bill or blade 13 pointing up instead of down, thus avoiding catching and dragging trash on the ground. After reversing the position of the plow shank and bill and re-securing the shank, the hood may again be closed down as before.

It is to be understood that the invention as herein disclosed may be varied from the details described and shown without departure from the spirit of the subjoined claims.

I claim:

1. In a cultivator, a plow beam, a long spring shank disposed at one end across the beam and having its other end down-turned and supporting an earth working blade, the shank having an upstanding spring coil formed therein, means securing the shank to said beam, a long hood pivotally supported at one end adjacent to the said one end of the shank for vertical swinging movement, the hood having a lowered position in which it houses said spring coil, and a detachable spring hold-down connection between the other end of the hood and the shank.

2. A construction of the character described in claim 1 wherein said hood has opposite side walls which rest upon the top of said plow beam when the hood is in the said lowered position.

3. In a cultivator construction including a plow beam, a long spring shank disposed at one end thereacross and having its other end downturned and supporting an earth working blade, the shank having an upstanding spring coil therein and means securing the said end of the shank to the beam, a detachable guard for the shank and the spring coil, comprising a relatively long hood having end and side walls, a holding flap hingedly secured to the bottom edge of one end wall, said holding flap being secured to the under side of the plow beam by the said shank securing means, the hood being oscillatable on the horizontal pivot provided by the connection between the said one end wall and the flap to extend horizontally across the beam in covering relation with the spring shank and the spring coil, portions of the side walls of the hood resting upon said plow beam, and a detachable spring coupling between the other end wall of the hood and said spring shank for securing the hood in covering position over the spring coil.

EDWAND V. BAILEY.

REFERENCES CITED

The following references are of record in the file of this patent:

UNITED STATES PATENTS

| Number | Name | Date |
|---|---|---|
| 893,767 | Volkmor | July 21, 1908 |
| 1,945,514 | Bowman et al. | Feb. 6, 1934 |

FOREIGN PATENTS

| Number | Country | Date |
|---|---|---|
| 459,065 | Germany | Apr. 27, 1928 |
| 681,661 | France | Feb. 3, 1930 |